United States Patent [19]

Smits et al.

[11] 4,359,481
[45] Nov. 16, 1982

[54] LIQUID SMOKE CONCENTRATE

[75] Inventors: Johannes W. Smits; Franciscus A. Timmermans, both of Oss, Netherlands

[73] Assignee: Internationale Octrooi Maatschappij "Octropa" B.V., Rotterdam, Netherlands

[21] Appl. No.: 217,320

[22] Filed: Dec. 17, 1980

Related U.S. Application Data

[63] Continuation of Ser. No. 973,782, Dec. 27, 1978, abandoned.

[30] Foreign Application Priority Data

Jan. 3, 1978 [GB] United Kingdom ............ 66/78

[51] Int. Cl.$^3$ ............................................. A23L 1/232
[52] U.S. Cl. ..................................... 426/533; 426/650; 426/652; 426/589; 426/486; 201/30
[58] Field of Search ............. 426/533, 650, 652, 589, 426/486, 314, 315; 201/30; 203/87; 196/139; 208/342

[56] References Cited

U.S. PATENT DOCUMENTS

| | | | |
|---|---|---|---|
| 1,374,887 | 4/1921 | Sawtelle | 201/30 |
| 2,840,515 | 6/1958 | Mora | 201/30 X |
| 3,043,752 | 7/1962 | Foch | 201/30 X |
| 3,106,473 | 10/1963 | Hollenbeck | 426/650 |
| 3,462,282 | 8/1969 | Fessmann | 426/314 |
| 3,873,741 | 3/1975 | Melcer et al. | 426/650 |
| 3,903,267 | 9/1975 | Miler et al. | 424/195 |
| 4,136,206 | 1/1979 | Kulesza et al. | 426/533 |
| 4,154,866 | 5/1979 | Dainius et al. | 426/650 |

FOREIGN PATENT DOCUMENTS 855350 11/1960 United Kingdom ............ 426/533

Primary Examiner—Esther M. Kepplinger
Attorney, Agent, or Firm—Cushman, Darby & Cushman

[57] ABSTRACT

A liquid smoke concentrate having a 3,4-benzpyrene- and 1,2,5,6-dibenzanthracene content of less than 0.2 nanograms, having a tar content (calculated as polycyclic aromatic hydrocarbons) below 1 microgram/kg, and a phenolic compounds content (calculated as phenol) of 0.90–1.60 g/l, preferably 1.0–1.4 g/l, and in which the ratio of phenolic compounds content to carbonyl compounds content (calculated as acetone) to total titratable acid content (calculated as acetic acid) is 1:(17.0–47.0):(13.0–40.0), preferably 1:(20.0–37.0):(14.0–34.0).

The concentrate is obtained by destructive distillation of cellulosic and/or lignin material, removing fly ashes, and separating two tar fractions by cooling to a temperature between 150°–200° C. and 80–120° C., respectively, non-condensable gases being separated off upon cooling to room temperature. The concentrate may be used in various physical forms as a flavoring agent in foodstuffs and as aromatizing agent.

6 Claims, No Drawings

LIQUID SMOKE CONCENTRATE

This is a continuation application of Ser. No. 973,782, filed Dec. 27, 1978, now abandoned.

The present invention relates to a liquid smoke concentrate obtained from condensed wood smoke formed by destructive distillation of cellulosic and/or lignin material, preferably in the presence of steam, to a process of treating comestible material with this liquid smoke concentrate, as well as to the comestible materials thus obtained and to liquid smoke preparations in various physical forms.

It is known to impart a smoked meat flavour and/or taste to foodstuffs by subjecting them to the action of wood smoke in aerosol state, which is usually carried out in draught smoking chambers. In these chambers the transfer of smoke components into the foodstuff takes place by diffusion. Sometimes smoke depositing on foodstuffs under the action of electrostatic forces is also being used. The direct action of smoke on to foodstuffs, however, is not only uneconomical, but also harmful smoke components, particularly carcinogenic polycyclic hydrocarbons may be deposited on the foodstuffs.

In order to prevent this, the smoking of foodstuffs by adding to them liquid smoke preparations has also been proposed. The term "liquid smoke" is meant to include any and all liquid media capable of imparting a smoke flavour and/or taste to a comestible product, similar to the flavour and/or taste achieved by direct smoking techniques, when the comestible product is exposed to that liquid medium.

The liquid smoke preparations known in the art, however, mostly suffer from the disadvantage that they differ appreciably from the typical smoked-product flavour and/or taste. This is mainly due to the fact that the smoke obtained by destructive distillation of cellulosic and/or lignin material (optionally combined with aromatic plants) is subjected to one or more chemical and/or physical treatments in order to remove the physiologically harmful constituents. In this sequence of process steps, however, not only all or the majority of these components which are physiologically harmful are removed, but also valuable aroma constituents, thus depriving the liquid smoke preparation of its specific smoked-product aroma and/or taste.

In "Die Fleischwirtschaft", Volume 5, Nr. 2, p. 183–187 (1974) the results of the investigation of a great number of commercially available liquid smoke preparations have been given. It was concluded that the specific smoked flavour and/or taste was for about 66% attributable to phenolic compounds, for about 14% to carbonyl compounds and for about 20% to the remainder of the constituents. Since over 300 compounds have been identified in the liquid products from the destructive distillation of cellulosic and/or lignin material, this implies that no clear indications can be given as to what compounds are responsible for the specific smoked flavour and/or taste.

It was concluded, however, that the phenolic compounds and the carbonyl compounds in the liquid smoke are mainly responsible for the specific aroma and/or taste. Too low a concentration of phenolic compounds, i.e. less than 4 g/l, was found not to lead to a real smoked product aroma and/or taste however, and if liquid smoke preparations with low phenolic compound concentrations were used, the applied amounts of smoke preparations needed to be high. This caused the concentration of carbonyl compounds to be too high, which resulted in a great loss of the essential amino acid lysine in the meat product treated.

On the other hand, smoke preparations with no phenolic compounds present and mainly comprising carbonyl compounds and organic acids did not produce the specific aroma and/or taste. Moreover, a high acidity is undesirable, because the acids react with the meat proteins to cause a loss in water-holding capacity of the meat after cooking.

It has now been found that very satisfactory liquid smoke concentrates may be obtained with a relatively low phenolic compound concentration and a relatively high carbonyl compound concentration, free from physiologically unacceptable compounds, and not exhibiting the disadvantages set out hereinbefore.

The present invention therefore provides a liquid smoke concentrate, having a 3,4-benzpyrene- and 1,2,5,6-dibenzanthracene-content less than 0.2 nanograms, formed by treating the smoke obtained by destructive distillation of cellulosic and/or lignin material, and having:

(a) a tar content (calculated as polycyclic aromatic hydrocarbons) below 1 microgram/kg,
(b) a phenolic compounds content (calculated as phenol) of from 0.90 to 1.60 gr/l.

and in which the ratio of phenolic compounds content to carbonyl compounds content (calculated as acetone) to total titratable acid content (calculated as acetic acid) is respectively 1:(17.0–47.0):(13.0–40.0).

The liquid smoke concentrate, having a 3,4-benzpyrene- and 1,2,5,6-dibenzanthracene-content less than 0.2 nanograms, obtained by destructive distillation of cellulosic and/or lignin material, preferably has (a) a tar content (calculated as polycyclic aromatic hydrocarbons) below 1 microgram/kg, (b) a phenolic compounds content (calculated as phenol) of from 1.00 to 1.40 gr/l, and a ratio of phenolic compounds content to carbonyl compounds content (calculated as acetone) to total titratable acid content (calculated as acetic acid) of respectively 1:(20.0–37.0):(14.0–34.0).

The chemical composition of the liquid smoke concentrate is taken at 20° C.

The phenolic compounds content is determined by diluting 10 ml of the liquid smoke concentrate with distilled water to 1000 ml. From this diluted solution 10 ml is taken, unto which are subsequently added: 0.6 ml of a 2 wt.% 4-amino-antipyrine solution, 2 ml of 2 N ammonia solution, and 2 ml of a 2 wt.% potassium ferricyanide solution. After each addition the contents of the flask are swung around and after the last addition the time (t) is determined. The final solution is diluted to 100 ml with distilled water and exactly after (t+2) minutes the extinction of the solution compared to water is measured in a 1 cm cuvette at 510 mµ (Es). Under the same conditions and in the same way the extinction of a blank solution is determined (Eb1), as well as the extinction of a standard phenol solution, containing 1 mg/ml of phenol (Est). The phenolic content expressed in g phenol/l is calculated from (Es−Eb1)/Est−Eb1).

The carbonyl compounds content (aldehydes and ketones) is determined by adding hydroxylamine.HCl to a certain amount of the liquid smoke concentrate in the presence of isopropyl alcohol, after which the equivalent amount of hydrochloric acid, liberated in the reaction with the carbonyl compounds, is determined by titration with N sodium hydroxide solution. The amount of carbonyl compounds in the liquid smoke concentrate is expressed in g acetone/l.

The total titratable acid content is determined by diluting 2 ml of the liquid smoke concentrate with 23 ml of distilled water and titrating this solution, with 0.1 N potassium hydroxide solution with the aid of a pH-meter.

The total titratable acid content is expressed in g acetic acid/l.

The liquid smoke concentrates according to the present invention in their application are diluted by means of a carrier, diluent or absorbent. As the carrier any edible substance may be used, such as salt, spices, curing mixtures, herbs, condiments, extracts, synthetic and/or natural flavouring and/or aromatizing preparations, ingredients for foodstuffs. As the diluent water, acidic liquids such as vinegar, alcohol, edible oils, fats, oil and water emulsions and/or other physiologically unobjectionable solvents or liquids may be used. As absorbents maltodextrins or starches may be used.

Depending on the ultimate use, flavouring and/or aromatizing preparations containing 0.01 to 10% by weight of the liquid smoke concentrate according to the invention may be used. The concentrate may be diluted directly before use. In order to increase the keepability of the liquid smoke concentrate, recognized food-acceptable antioxidants, such as butylated hydroxyanisole (BHA) and butylated hydroxytoluene (BHT) may be added thereto.

The present invention also provides a process for the treatment of a foodstuff in which the foodstuff is treated with the liquid smoke concentrate as such or in diluted form by the methods of incorporating, dipping, spraying, injection and the like.

During such a process the pH of the liquid smoke concentrate may be adjusted by adding edible acids or bases. It will be clear that the foodstuffs preferably are meat, meat products and fish, but also dairy products, such as cheese and spreads, aand bakery products or frying oils, as well as malt for whisky manufacture, can be treated with the liquid smoke concentrate.

The liquid smoke concentrate may also be used as a smoke aromatizing and/or flavouring agent for ready meals, and in sauces, dressings, soups and like products. The concentrate may also be brought into a solid form as smoke flavouring agent, for instance, by spray-drying on a carrier like e.g. maltodextrin, or by freeze-drying. The present invention hence also encompasses a liquid smoke concentrate or liquid smoke compositions based on the concentrate according to the present invention in these various physical forms.

The liquid smoke concentrate according to the present invention is obtained by treating the smoke obtained in the destructive distillation of cellulosic and/or lignin material, preferably in the presence of steam. A preferred process for producing smoke to be treated according to the present invention has been described in the British Patent Specifications Nos. 1,137,636, 1,137,637 and 1,262,925 wich are incorporated in this application by way of reference.

The liquid smoke produced by the smoke generator is subjected to fractional condensation. The smoke obtained from the smoke generator at a temperature of 350°–450° C. is first liberated from fly ash particles, after which a first heavy tar fraction is removed by cooling to a temperature between 150° C. and 200° C. In a second stage, the smoke is cooled to a temperature between 80° C. and 120° C., so that a second tar fraction is removed. Finally the product is cooled to room temperature and non-condensable gases are separated off.

The concentration and the pH-value of the final liquid smoke concentrate may be adjusted by adding resp. diluent, such as e.g. water, and an edible acid, or an innocuous base.

The fractional condensation is carried out in such a way that the phenolic compounds content (calculated as phenol) is from 0.90 to 1.60 g/l of liquid smoke concentrate, whereas the ratio of phenolic compounds content to carbonyl compounds content (calculated as acetone) to total titratable acids content (calculated as acetic acid) is 1:(17.0–47.0):(13.0–40.0).

The present invention hence also encompasses a process for the preparation of a liquid smoke concentrate, having a 3,4-benzpyrene- and 1,2,5,6-dibenzanthracene-content of less than 0.2 nanograms, obtained from condensed wood smoke formed by destructive distillation of cellulosic and/or lignin material, by subjecting said condensed wood smoke to fractional condensation and removing the tar fractions condensing at a temperature between 150° C. and 200° C., and at a temperature between 80° C. and 120° C., and separating off the non-condensable gases. Preferably the tar fractions condensing between 170° C. and 190° C. and between 90° C. and 100° C. are removed.

The invention is now illustrated by the following non-restrictive Examples.

EXAMPLE I

Condensed wood smoke, obtained from a Fessmann smoke generator as described in British Patent Specification No. 1,137,637 (using mainly oak and beech wood) at about 400° C., was liberated from fly ash particles after which two tar fractions were removed by fractional condensation at 170° C. and 95° C., respectively. Non-condensable gases were separated off and the final liquid smoke concentrate obtained had a phenolic compounds content of 1.10 g/l, whereas the ratio of phenolic compounds content to carbonyl compounds content (calculated as acetone) to total titratable acids content (calculated as acetic acid) was 1:33.6:24.5. The liquid smoke concentrate was free from 3,4-benzpyrene and 1,2,5,6-dibenzanthracene. (Tar content less than 1 microgram/kg).

A Frankfurter type of sausage was prepared by stuffing in a conventional casing:

| Pork meat | 50.0 | wt. % |
|---|---|---|
| Beef meat | 2.5 | wt. % |
| Rind emulsion | 10.0 | wt. % |
| Pork fat | 13.5 | wt. % |
| Water | 16.0 | wt. % |
| Starch | 4.0 | wt. % |
| Spices, salt | 4.0 | wt. % |

The Frankfurter sausage thus obtained was dried and subsequently immersed for 30 seconds in the liquid smoke concentrate described above having a temperature of 50° C.

The product thus obtained was compared to a Frankfurter sausage of the same composition, made in the same way, but smoked in a smoke-house. The comparison was made by a specialist experienced taste panel of 10 members. The Frankfurter sausage immersed in the liquid smoke concentrate was preferred by 9 members to the conventional product.

If a liquid smoke concentrate was used in which the phenol content was greater than 1.60 g/l liquid smoke concentrate, but in which the carbonyl compounds content and the total titratable acids content was within the ranges of the present invention, the specialist taste panel unanimously expressed the opinion that the typical taste of a smoked product was absent, whereas 8 members expressed the opinion that the Frankfurter sausage immersed in the liquid smoke concentrate had a strong "phenolic" taste.

If a liquid smoke concentrate was used in which the carbonyl compounds content (calculated as acetone) was below the ranges as prescribed by the present invention, whereas the phenolic compounds content was between 0.90 and 1.60 g/l of liquid smoke concentrate, and the total titratable acids content (calculated as acetic acid) was within the limits according to the present invention, 8 members of the specialist taste panel considered the colour of the Frankfurter sausage to be unacceptable, and 9 members preferred the conventionally made Frankfurter sausage to the sausage immersed in the liquid smoke concentrate.

If a liquid smoke concentrate was used in which the phenolic compounds content was between 0.90 and 1.60 g/l of liquid smoke concentrate, the carbonyl compounds content was within the limits according to the present invention, but the total titratable acids content was not within the limits according to the present invention, 7 members of the specialist taste panel found the taste of the Frankfurter sausage unacceptable.

These results clearly demonstrate that each of the three components of the composition of the liquid smoke concentrate is essential and that the three components have an interlocking effect on the desired end result, viz a Frankfurter sausage with a consumer-acceptable appearance and a typical "smoked" taste.

EXAMPLE II

The liquid smoke concentrate as prepared and described in Example I (i.e. having a phenolic compounds content of 1.10 g/l and a ratio of phenolic compounds content to carbonyl compounds content to total titratable acids content of 1:33.6:24.5) was used in the preparation of a pork sausage of the salami type composed of:

| | | |
|---|---|---|
| Pork belly trimmings | 93.4 | wt. % |
| Blood | 0.4 | wt. % |
| Salt and spicings | 3.2 | wt. % |
| Sausage meat with lactic acid bacteria culture | 1.0 | wt. % |
| Liquid smoke concentrate as prepared | 2.0 | wt. % |

After being stuffed in a conventional casing, the product was conventionally processed, with the exception of smoking in a smoke-house, which was omitted.

The product thus obtained was compared to a pork sausage of the same composition, made in the same way, but smoked in a smoke-house. The comparison was made by an experienced taste panel of 10 members. The pork sausage with the liquid smoke concentrate was preferred by 9 members to the conventional product.

If a liquid smoke concentrate was used in which the phenol content was greater than 1.60 g/l liquid smoke concentrate, but in which the carbonyl compounds content and the total titratable acids content was within the ranges of the present invention, the taste panel unanimously expressed the opinion that the required taste of a smoked product was absent, whereas 8 members expressed the view that the pork sausage with the liquid smoke concentrate had a strong "phenolic" taste.

If a liquid smoke concentrate was used in which the carbonyl compounds content (calculated as acetone) was below the ranges as prescribed by the present invention, whereas the phenolic compounds content was between 0.90 and 1.60 g/l of liquid smoke concentrate and the total titratable acids content (calculated as acetic acid) was within the limits according to the present invention, 8 members of the taste panel considered the taste of the pork sausage to be unacceptable, ("sourish" and "phenolic") and 7 members preferred the conventionally made pork sausage over the sausage containing the liquid smoke concentrate.

If a liquid smoke concentrate was used in which only the phenolic compounds content and the carbonyl compound content were within the limits according to the present invention, 8 members of the taste panel found the taste of the pork sausage unacceptable.

EXAMPLE III

The liquid smoke concentrate as prepared and described in Example I was used in the preparation of a dry smoke flavouring agent powder by making a slurry of:

45% by weight of maltodextrin (Paselli MD-20; Trade Mark)
50% by weight of the liquid smoke concentrate of Example I
5% by weight of water.

This slurry was dried in a spray-drier (temperature entering air: 180° C.; temperature exit air: 95° C.). The powder obtained was especially suitable for the flavouring of soup powders and dressing powders to be reconstituted with water. A dry soup powder was made from:

97% by weight of dried ground peas
1.5% by weight of herbs and spices
1.5% by weight of sodium chloride.

Of this mixture 125 g were mixed with 2 g of the aromatizing powder prepared by spray-drying the liquid smoke concentrate as described herebefore, and to this powder mixture water was added to obtain 1 l of soup (Soup A).

The same soup was also prepared without the smoke flavouring powder according to the invention, but with the same amount of a commercial liquid smoke flavouring powder, which had a phenolic compounds content to carbonyl compounds content ratio of 1:5 (Soup B).

Upon investigation by a taste panel of experienced tasters 7 out of 9 tasters preferred soup A having the smoke flavouring agent powder according to the present invention.

EXAMPLE IV

Wood smoke, obtained from a Fessmann smoke generator as described in British Patent Specification No. 1,137,637 (using mainly oak and beech wood) at about 400° C., was liberated from fly ash particles and condensed, after which two tar fractions were removed by fractional condensation at 160° C. and 85° C. respectively. Non-condensable gases were separated off and the final liquid smoke concentrate obtained had a phenolic compounds content of 0.92 g/l, whereas the ratio of phenolic compounds content to carbonyl compounds content (calculated as acetone) to total titratable acids content (calculated as acetic acid) was 1:21.7:19.6. The product had a tar content (calculated as polycyclic aromatic hydrocarbons) below 1 microgram/kg and was free from 3,4-benzpyrene and 1,2,5,6-dibenzanthracene. This liquid smoke concentrate was used in the preparation of luncheon meat. Normally this product obtains its typical flavour and taste by using smoked bacon in its preparation. This smoked bacon is obtained by smoking in a normal draught smoking chamber, which results in a product that has a varying quality and moreover has a variable tar content. Also the processing time is uneconomically long.

If a substitute for the smoked bacon could be found, leading to the same flavour and aroma of the luncheon meat, this would be of great advantage in view of the disadvantages mentioned herebefore. Various commercial smoke flavouring agents were tested, none of them leading to acceptable results however.

A mixture of 70% by weight of pork trimmings (having a total fat content of 30%), salt to provide a final salt content of 2.5% by weight, and herbs and spices to provide a content of 3% by weight in the final product, 3% by weight of flour and the remainder water, was minced and mixed in a bowl chopper. The minced meat mixture obtained was stuffed in casings (luncheon meat A).

Another batch of luncheon meat was prepared, having the same ingredients in the same ratios as used in luncheon meat A, but using instead of smoked pork trimmings non-smoked pork trimmings. To the mixture was also added 0.4% by weight of the liquid smoke concentrate as prepared above (luncheon meat B).

As experienced panel of 11 tasters could not taste any difference between luncheon meat A and luncheon meat B, so that the liquid smoke concentrate can be used for the flavouring of luncheon meat without any loss in quality, but avoiding all the drawbacks involved by the use of smoked bacon, which is of great advantage.

EXAMPLE V

Berliner sausage is characterized by a delicate smoke taste which is imparted to the product by the use of smoked pork bellies, the so-called delicacy-belly. This method of preparation is rather costly, however, and the quality of smoked pork bellies obtained in normal draught smoking chambers varies to a large extent. It was tried to use commercial liquid smoke preparations, but these either led to a strong phenolic taste of the sausage or to no smoke taste at all. Two recipes were made, one using the classical smoked pork bellies and the other the liquid smoke concentrate as prepared in Example I, namely:

| Recipe A | Recipe B |
| --- | --- |
| 42% by weight of pork livers | 42% by weight of pork livers |
| 45% by weight of smoked pork cheeks | 51% of non-smoked pork cheeks |
| 3% by weight of potato starch | 3% by weight of potato starch |
| 3.5% by weight of salt and spices | 3.5% by weight of salt and spices |
| 6.5% by weight of water | 0,5% by weight of liquid smoke concentrate of Example I. |

Both recipes were processed in the same way, viz chopped in a bowl chopper, stuffed in casings and cooked.

An experienced taste panel investigated both types of Berliner sausages, resulting in that 7 out of 10 tasters preferred the sausages of recipe B, in which the liquid concentrate of the invention had been applied.

This result clearly shows that the manufacture of Berliner sausages not only can be greatly improved and simplified by using the smoke concentrate according to the present invention, but also that the taste and flavour are regarded to be even better than those of the Berliner sausage made in the classical way, using the expensive smoke pork bellies.

We claim:

1. A process of preparing a liquid smoke concentrate, having a 3,4-benzpyrene- and 1,2,5,6-dibenzanthracene-content of less than 0.2 nanograms, a tar content (calculated as polycyclic aromatic hydrocarbons) below 1 microgram/kg and a phenolic compounds content (calculated as phenol) of from 0.90 to 1.60 g/l, and in which the ratio of phenolic compounds content to carbonyl compounds content (calculated as acetone) to titratable acid content (calculated as acetic acid) is 1:(17.0–47.0):(13.0–40.0) which consists essentially of liberating the smoke obtained in the destructive distillation at 350°–450° C. of cellulosic and/or lignin material from fly ash particles, then removing a first heavy tar fraction by cooling the smoke to a temperature between 150° C. and 200° C., subsequently removing a second tar fraction by further cooling the smoke remaining after the first tar separation to a temperature between 80° C. and 120° C., and finally condensing the residual smoke by cooling to room temperature while separating off the non-condensable gases, to obtain from the thus condensed residual smoke the liquid smoke concentrate having the characteristics indicated.

2. A process according to claim 1, in which the first heavy tar fraction is removed by cooling the smoke to a temperature between 170° C. and 190° C. and the second tar fraction is removed by further cooling the smoke remaining after the first tar separation to a temperature between 90° C. and 100° C.

3. A process according to claim 1, in which the destructive distillation of cellulosic and/or lignin material is carried out in the presence of steam.

4. A liquid smoke concentrate, comprising a 3,4-benzpyrene- and 1,2,5,6-dibenzanthracene-content of less than 0.2 nanograms, a tar content (calculated as polycyclic aromatic hydrocarbons) below 1 microgram/kg and a phenolic compounds content (calculated as phenol) of from 0.90 to 1.60 g/l and in which the ratio of phenolic compounds content of carbonyl compounds content (calculated as acetone) to total titratable acid content (calculated as acetic acid) is 1:(17.0–47.0):(13.0–40.0), prepared by the process as claimed in claim 1.

5. A process of imparting a smoke flavour and/or taste to a foodstuff or an ingredient for a foodstuff, in which the foodstuff or the ingredient for a foodstuff is combined with from 0.01 to 10% by weight of a liquid smoke concentrate having a 3,4-benzpyrene- and 1,2,5,6-dibenzanthracene-content of less than 0.2 nanograms, a tar content (calculated as polycyclic aromatic hydrocarbons) below 1 microgram/kg and a phenolic compounds content (calculated as phenol) of from 0.90 to 1.60 g/l and in which the ratio of phenolic compounds content to carbonyl compounds content (calculated as acetone) to total titratable acid content (calculated as acetic acid) is 1:(17.0–47.0):(13.0–40.0).

6. A foodstuff or an ingredient for a foodstuff, having a smoke flavour and/or taste, prepared by the process claimed in claim 5.

* * * * *